C. O. BASTIAN.
VAPOR ELECTRIC APPARATUS AND METHOD OF OPERATING THE SAME.
APPLICATION FILED APR. 28, 1910.
982,119.  Patented Jan. 17, 1911.
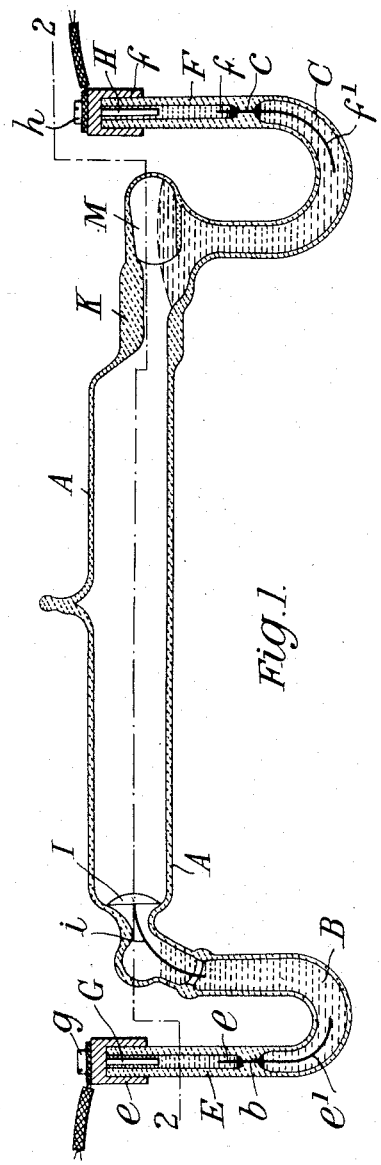
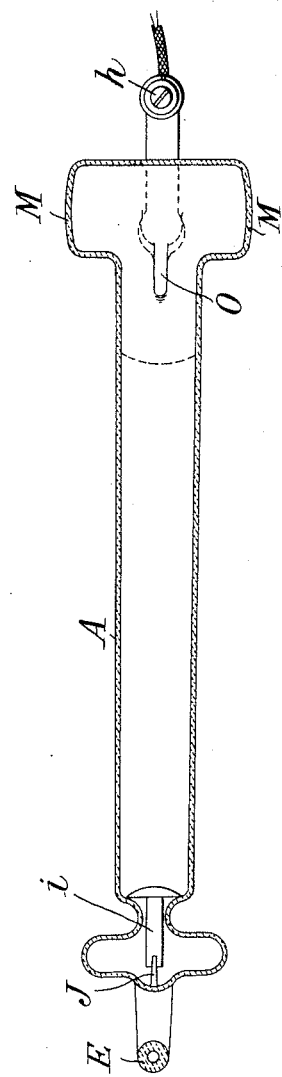
Witnesses
B. B. Collings
Inventor
C. O. Bastian
his Attorneys

UNITED STATES PATENT OFFICE.

CHARLES ORME BASTIAN, OF LONDON, ENGLAND.

VAPOR ELECTRIC APPARATUS AND METHOD OF OPERATING THE SAME.

982,119.           Specification of Letters Patent.       Patented Jan. 17, 1911.

Application filed April 28, 1910. Serial No. 558,184.

*To all whom it may concern:*

Be it known that I, CHARLES ORME BASTIAN, electrical engineer, a subject of the King of Great Britain, residing at No. 32 The Avenue, Brondesbury Park, London, England, have invented certain new and useful Improvements in or Relating to Vapor Electric Apparatus and Methods of Operating the Same, of which the following is a specification.

This invention relates to vapor electric apparatus, and more especially to vapor electric lamps the containing envelop of which is made of a material of high heat resisting property such as quartz.

The present invention is designed (*inter alia*) to simplify the construction of such apparatus and to render it less liable to damage or fracture through careless handling or in transit from place to place, and also to improve the efficiency of such apparatus.

According to this invention a burner for a vapor electric lamp for example may be constructed as follows:—

At one end of a tubular quartz envelop (say 12 cms. long by 1.5 cms. diameter) we locate within said envelop a thin disk of metal adapted to act as a positive electrode. At the other end of and within said tubular envelop we locate some mercury or other liquid electrode material to act as the negative electrode. Both these electrodes are connected with suitable leading-in conductors through mercury which is or may be contained in U-tubes or equivalent, such U-tubes being formed as extensions of each end of the quartz envelop. Both U-shaped extensions (or equivalent) may be in the same plane; and both may be at right-angles or thereabout to the longitudinal axis of the quartz envelop. The leading-in conductor may be sealed into the U-shaped extension pieces aforesaid about 2.5 cms. from the ends thereof, so that 2.5 cms. of tube will be left above and beyond each seal as a cup adapted to contain mercury or mercury - cadmium alloy or any other suitable material adapted to prevent leakage of air through the seal; and the leading-in conductor should be sealed into the material of the U-tube extension in such a way as to prevent leakage of the mercury or other material in the cup into or past the seal. In carrying out this invention it has been found advantageous to make the U-tube extensions of quartz (*i. e.* of the same material as the envelop) and I may form the seal through the quartz tube with an alloy of 90% platinum and 10% iridium by forming the conductor as a rivet through the quartz as for example in the manner described in British Patent No. 21,383 of 1905.

The heads of the iridio-platinum rivets may have wires welded or otherwise connected thereto, to insure good electrical contact between the material above and below or on each side of the seal. The bore of the tube above same is advantageously made so small as to retain mercury within it when in any position by capillary attraction and we find that 2 m. m. is a suitable diameter.

The mercury in the cup or extension beyond the seal may be retained in position by means of shellac of paris, fortafix, or other suitable filling or stopper.

The positive metal disk may be provided or formed with a projecting piece adapted to dip into and be retained within the mercury in the adjacent U-tube extensions; and the metal disk may be conveniently anchored in position by means of the aforesaid projecting piece the primary object of which is to provide a path for the current to the disk.

The mercury forming the negative electrode may lie immediately over the junction of the U-tube extension at the negative end of the quartz envelop so as to make contact directly with the mercury in that U-tube and through it to the negative leading-in wire. The negative end of the quartz envelop may advantageously be more or less flattened for about 3.5 cms. so that the negative mercury electrode may be contained in a flattened form of chamber having a flattened orifice connecting it with the cylindrical portion of the quartz envelop which orifice may for example measure about 3 m. m. by 15 m. m. having suitable thickened walls and specially thickened at the region of highest temperature.

Means through which the burner may be exhausted and then sealed off air-tight may be provided at any convenient point preferably about the longitudinal center of the quartz envelop.

A burner constructed as above described may be connected across a circuit from 200 to 250 volts in series with a resistance of from 20 to 30 ohms.

It must be well understood that burners may be constructed according to this invention of dimensions differing widely from those herein set out according to the voltage of the circuits on which it is desired to operate the burners and according to the watts they are designed to transform.

The metal employed for the disk must be such as to withstand the temperature at which the burner is designed to operate. For moderately high temperatures as indicated by the color of the solid electrode nickel is suitable but platinum, tantalum, iridium, or alloys of any of these may be used with advantage for the highest temperatures to which the burner has yet been successfully worked in practice namely such as to raise the temperature of the solid electrode from 600° to 1,400° C. and over.

In a quartz envelop of the dimensions aforestated, we have found that a suitable positive electrode may be a circular iridium or platinum or tantalum disk measuring about 0.5 m. m. thick and about 1 cm. diameter; and this disk may be connected with the mercury in the adjacent U-tube extension by an iridium or tantalum tang about 2 cm. long by 2 m. m. wide to 3 m. m. wide and about 0.5 m. m. thick which tang can also be used as a means of anchoring or positively locating the position of the disk to which it is attached or of which it forms an extended part.

The arc having been struck the temperature inside the envelop will quickly rise, bringing about a high vapor density and a consequent increase in the resistance between the two electrodes and by the time temperature equilibrium is established the current in the circuit will be about 3 to 4 amperes and the difference of potential across the burner terminals will be about 140 to 160 volts, when the lamp is being operated as above described on a circuit of from 200 to 250 volts.

Mercury at the negative electrode should be provided in sufficient quantity to insure a continuous stream being formed between the electrodes in order that the arc may be struck with certainty when the burner is moved, so that the negative electrode is above the positive electrode, but with due regard to this necessity it is advantageous to employ as little mercury as possible in the burner so that the burner may quickly attain its maximum working temperature and thereafter be maintained thereat with the least possible consumption of electric energy.

By the construction above described it has been found possible to produce a mercury vapor lamp of much lighter weight per watt consumed than has heretofore been possible and the reduced amount of mercury in the burner renders the latter less liable to damage in transit.

It is important to use a small gage of wire for forming the rivet shaped leading-in conductors and satisfactory results are to be obtained with iridio-platinum wire hard drawn to .012 inch diameter, but this detail may be varied and other details set out above may be varied without departing from the present invention.

Referring to the accompanying drawings:—Figure 1 is a longitudinal sectional view of a vapor electric apparatus in accordance with the present invention. Fig. 2 is a horizontal sectional view taken on the line 2—2 Fig. 1.

A is the envelop made of transparent material of high heat resisting property such as quartz which envelop A where it incloses the arc path is advantageously made of cylindrical shape in cross-section and at each end is provided with U-shaped members B C which latter at their inner ends are in communication with the central part of said envelop and at the other end each said U-shaped member has the conductor sealed therethrough at the points marked $b$ and $c$ respectively; and, above said seals $b$ and $c$ capillary chambers E and F respectively are provided the interior of which latter are filled with mercury which is retained therein by the cap $e$ and $f$ respectively secured (by any suitable means) over the top end thereof.

The electrical conductor is connected to the small screws G H advantageously of iron (which are screwed into position by means of the heads $g$ $h$ thereon) which screws G H respectively dip into the mercury in said capillary chambers E and F respectively and the latter through the conductor wires $e$ $f$ conduct the electric current through the seals $b$ and $c$ to the conductor wires $e^1$ and $f^1$ and thence through the column of mercury (or mercury alloy) in the respective U-tubes to the electrode surfaces.

I is a solid positive electrode surface (which may advantageously be made of tantalum; or if desired of platinum or iridium) located at one end of the arc path in the envelop A; and on the back of this solid electrode there is attached a short electrical conductor in the form of a tang wire or ribbon such as $i$ which at its other end is held immersed constantly in the mercury column in the U-tube B. The other end of this tang $i$ may be anchored or secured in position (so as to maintain it immersed in the mercury as aforesaid) as for example said tang may be provided with an eye loop or slot through which is passed a pin or thin stick J of quartz (or equivalent) which is then fused to the walls of the U-tube B.

Toward the other end of the envelop A the shape of the latter is of flattened form and advantageously is provided with a thickened portion K for the purpose of producing a cooling effect, and a little farther along is provided with two lateral extensions M (see Fig. 2) so as to form an enlarged pocket at this end of the apparatus for containing a sufficient quantity of mercury for streaming along the arc path to start the arc.

Any suitable means may be provided to cause or tend to assist the mercury to stream along the bottom of the envelop when the latter is tilted; for example I may provide the narrow channel O (like a pouring spout) which latter tends to cause the mercury to assume a continuous stream-like formation as it runs toward the positive electrode I.

What I claim is:—

1. In a vapor electric apparatus adapted to work at a high temperature, the combination of a positive electrode surface of solid material; an exhausted envelop surrounding the said surface; a column of mercury below said surface; a connection between said surface and said mercury; a second column of mercury carried by said envelop; and a solid metallic connection between said first and second columns; substantially as described.

2. In a vapor electric apparatus adapted to work at a high temperature, the combination of a positive electrode surface of solid material; an exhausted envelop surrounding the said surface; a column of mercury below said surface; a connection between said surface and said mercury; a second column of mercury carried by said envelop; a solid partition separating said second column from the first column; a solid metallic connection passing through said partition between said first and second columns; and means joining said second column with the outside circuit, substantially as decribed.

3. In a vapor electric apparatus, adapted to work at a high temperature, the combination of a positive electrode surface of solid material; an exhausted envelop surrounding the said surface; a column of mercury below said surface; a connection between said surface and said mercury; a second column of mercury carried by said envelop; a solid metallic connection between said first and second columns; a column of mercury carried by the said envelop constituting the negative electrode; an independent column of mercury associated with said negative electrode; and means connecting said independent column and said negative electrode, substantially as described.

4. In a vapor electric apparatus adapted to work at a high temperature, the combination of a positive electrode surface formed of a solid material; an exhausted inclosing envelop formed of quartz; a mercury holding chamber carried by said envelop at each end; a connection between said mercury and said electrode; a partition in said envelop; a second column of mercury separated from the first column by said partition; a connection passing through said partition and joining said columns; a space being provided between the mercury in said first column and said positive electrode; an electrode at the other end of said envelop; and a thickened wall portion constituting a cooling means near said other electrode, substantially as described.

In witness whereof I have hereunto set my hand in presence of two witnesses.

CHARLES ORME BASTIAN.

Witnesses:
  EDWIN GANDER,
  HERBERT D. JAMESON.